Aug. 19, 1930.    W. R. DUNNAM    1,773,100
SAFETY GATE
Filed May 7, 1929    5 Sheets-Sheet 1

Inventor:
WILLIAM R. DUNNAM,
by: Usina & Rauber
his Attorneys.

Aug. 19, 1930.    W. R. DUNNAM    1,773,100
SAFETY GATE
Filed May 7, 1929    5 Sheets-Sheet 3

Inventor:
WILLIAM R. DUNNAM,
by: Usina & Rauber
his Attorneys

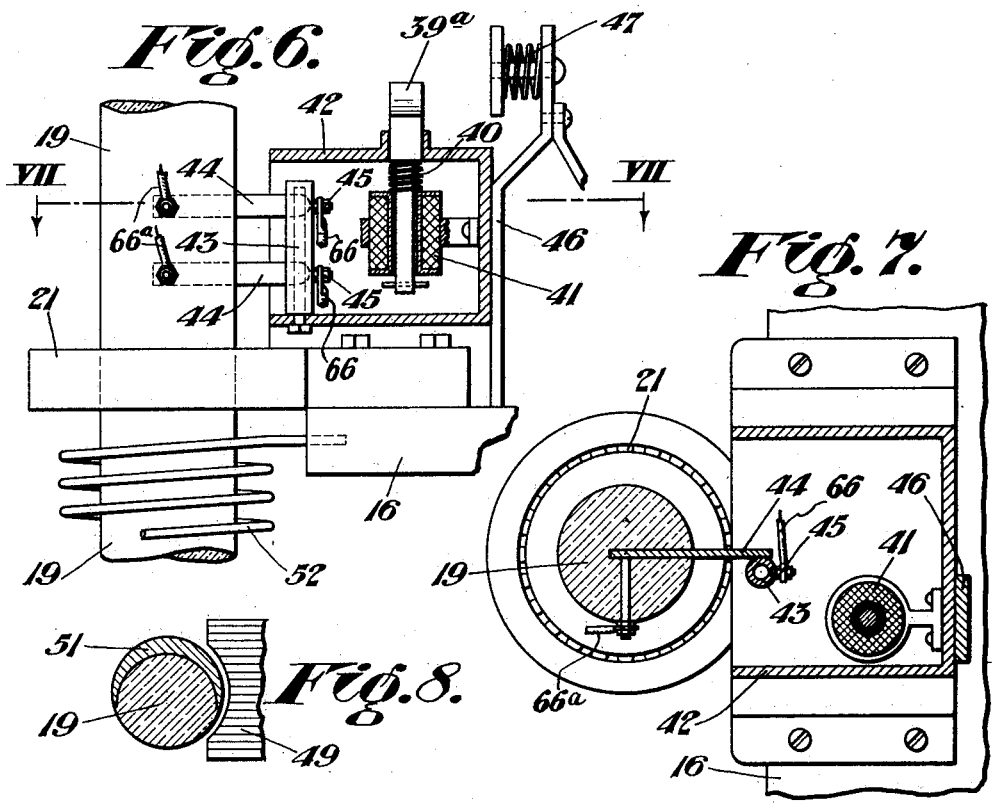

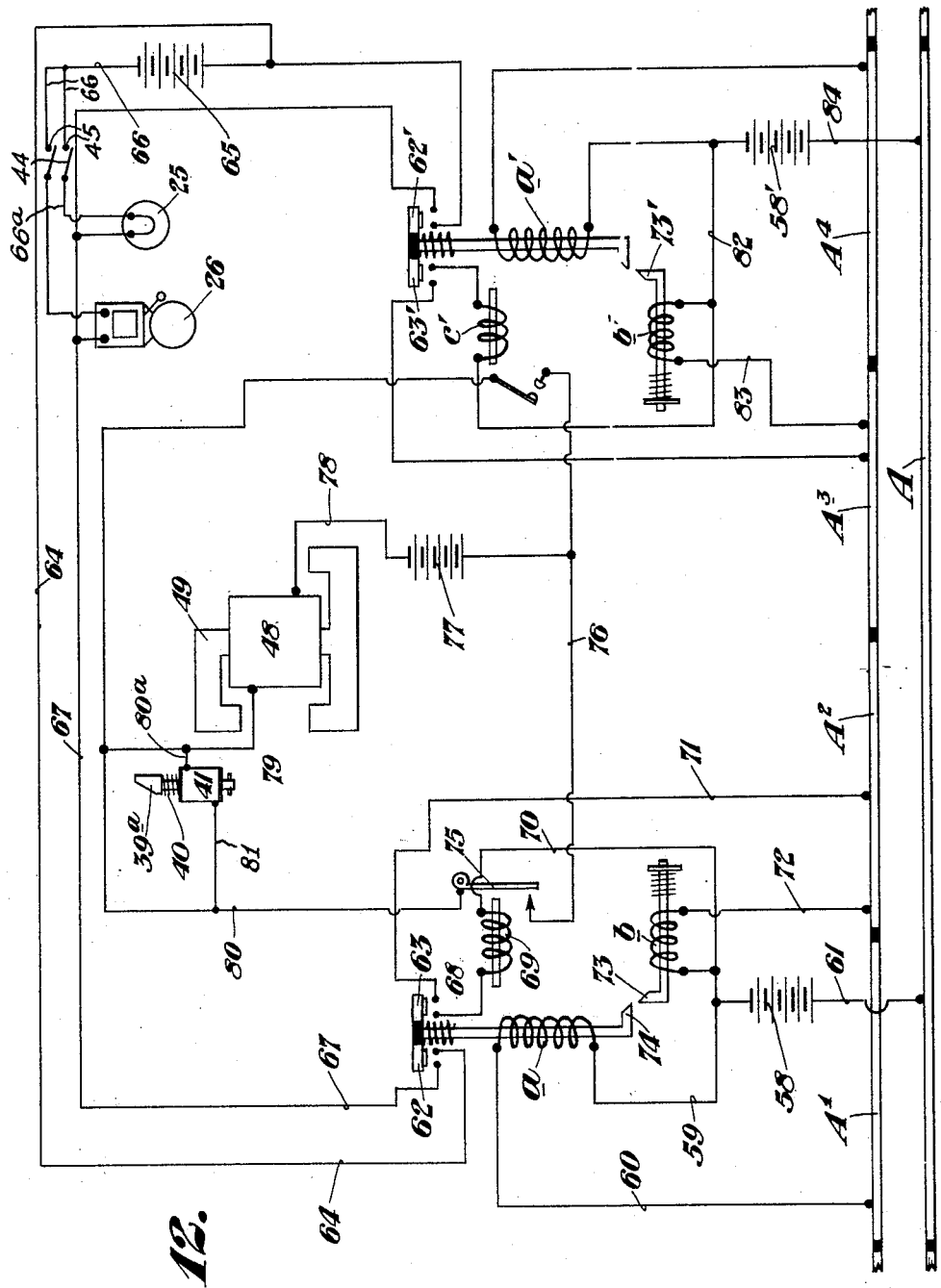

Patented Aug. 19, 1930

1,773,100

UNITED STATES PATENT OFFICE

WILLIAM R. DUNNAM, OF GARY, INDIANA

SAFETY GATE

Application filed May 7, 1929. Serial No. 361,045.

This invention relates to railway crossing gates, an object being to provide normally inactive vehicle and pedestrian gates which are capable of swinging to an active position, together with visual and audible signals to indicate the approach of a train.

Another object of the invention is the provision of electrically operated train controlled means for operating the signals, releasing the gates and moving them to an active position, means being provided for regulating the speed of travel of the gates so that their movement in either direction will not be unduly rapid.

Another object of the invention is the provision of a gate of the above character which may be opened through contact by a vehicle and thereafter automatically closed, so that a vehicle trapped upon the crossing may escape without damage.

Another object of the invention is the provision of a railway crossing gate which includes a horizontally disposed arm mounted so that contact by a vehicle will move the arm inwardly with little or no damage either to the arm or vehicle, the said arm thereafter automatically returning to normal position.

With the above and other objects in view, the invention further includes the following novel features and details of construction, to be hereinafter more fully described, illustrated in the accompanying drawings and pointed out in the appended claims.

In the drawings—

Figure 5 is an enlarged section on the line V—V of Figure 1.

Figure 6 is a fragmentary vertical sectional view through the gate latch housing and showing the contacts for completing a circuit through the signals.

Figure 7 is a section on the line VII—VII of Figure 6.

Figure 8 is a detail sectional view on the line VIII—VIII of Figure 2.

Figure 9 is a detail sectional view on the line IX—IX of Figure 2.

Figure 10 is an enlarged detail section on the line X—X of Figure 1.

Figure 11 is an enlarged fragmentary sectional view showing a modified form of roller mounting for the gate arm.

Fig. 12 is a diagram of the controlling circuits.

Fig. 13 is a view of a detail.

Referring to the drawings in detail wherein like characters of reference denote corresponding parts, the invention as shown includes separate vehicle and pedestrian gates indicated at V and P respectively.

Figure 1:
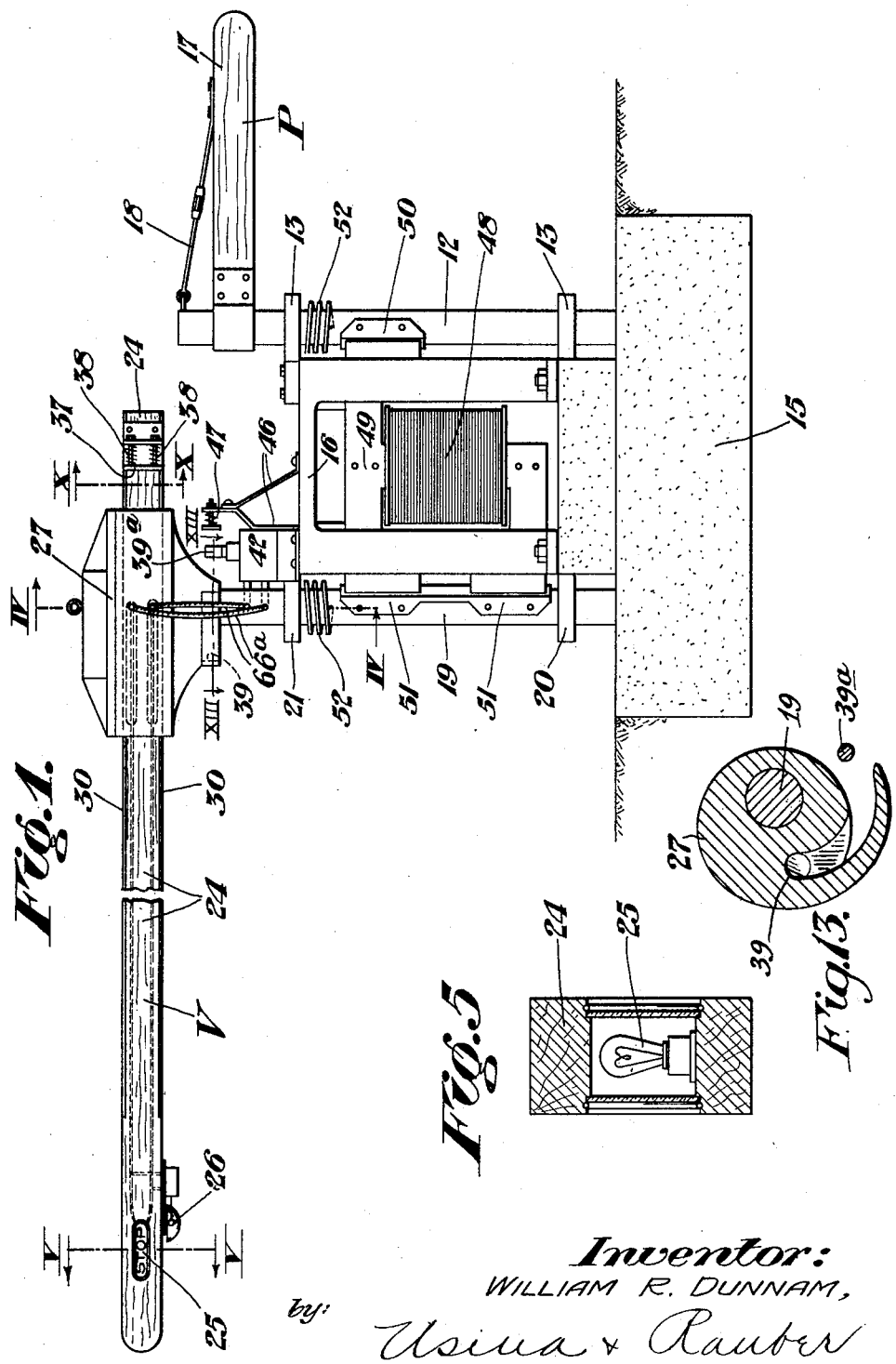
Figure 1 is a side elevation of a railway crossing gate constructed in accordance with the invention.

The pedestrian gate P includes a rotatably mounted post 12 which is supported in suitable antifriction bearings 13 and which extends into a pit 14 provided in a suitable foundation 15. The bearings 13 extend from a frame 16 which is suitably anchored in the foundation. The gate P also includes a horizontally disposed arm or barrier 17 whose inner end is secured to the post 12 and whose outer end is supported by a brace 18 attached to the post.

The gate V includes a post 19 which is mounted for rotation in antifriction bearings 20 and 21 extending from the frame 16, the lower end of the post extending into a pit 22. Both the post 12 and the post 19 are mounted at their lower ends upon antifriction bearings 23. Extending from the upper end of the post 19 is a horizontally disposed vehicle barrier arm 24. This arm carries at its outer end a visual signal or lamp 25 and an audible signal or bell 26.

The arm 24 is mounted for horizontal sliding movement and for this purpose the post 19 has mounted thereon a head 27. This head is provided with a passage 28 through which the inner end of the arm 24 extends. Arranged within this passage above and below the arm are antifriction rollers 29. These rollers are arranged in spaced relation and contact with bearing plates 30 which extend along the top and bottom edges of the arm 24. These plates are provided with longitudinally extending ribs 31 which enter the space between the rollers 29.

Mounted within the head 27 upon opposite sides of the arm 24 are drums 32 and 33. Cables 34 are wound upon the drums 32 and each has one of its ends connected to the arm 24 upon opposite sides of the latter, as at 34$^a$, so that when the arm is moved in one direction, the cables will unwind. Springs 35 are wound upon the drums 33 and have one of their ends connected to the drums and their opposite ends connected to the head 27, as shown at 36, so that when the cables 34 are unwound from the drums the springs will be tensioned.

Figure 2:
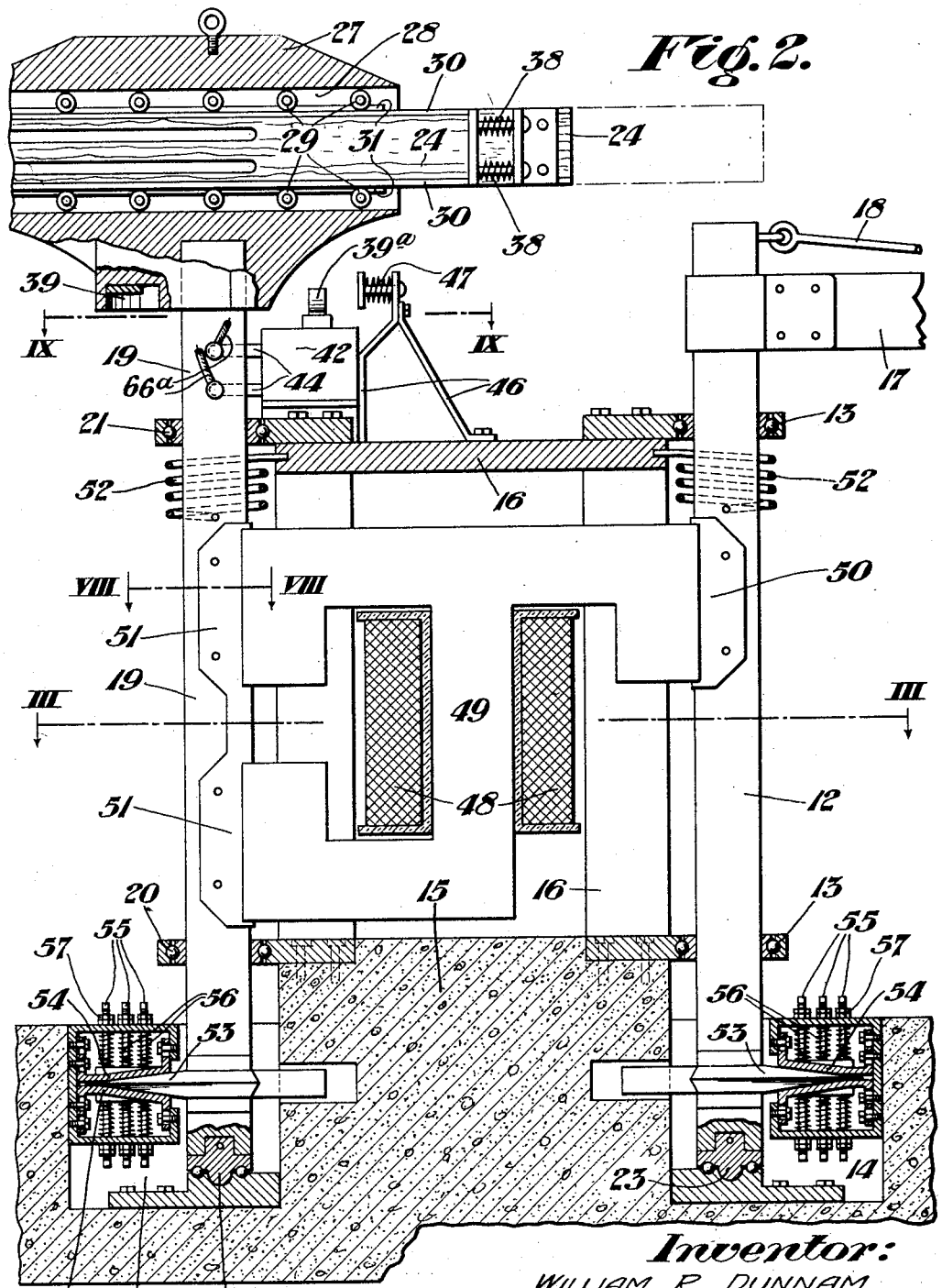
Figure 2 is an enlarged fragmentary vertical sectional view.
Figure 3:
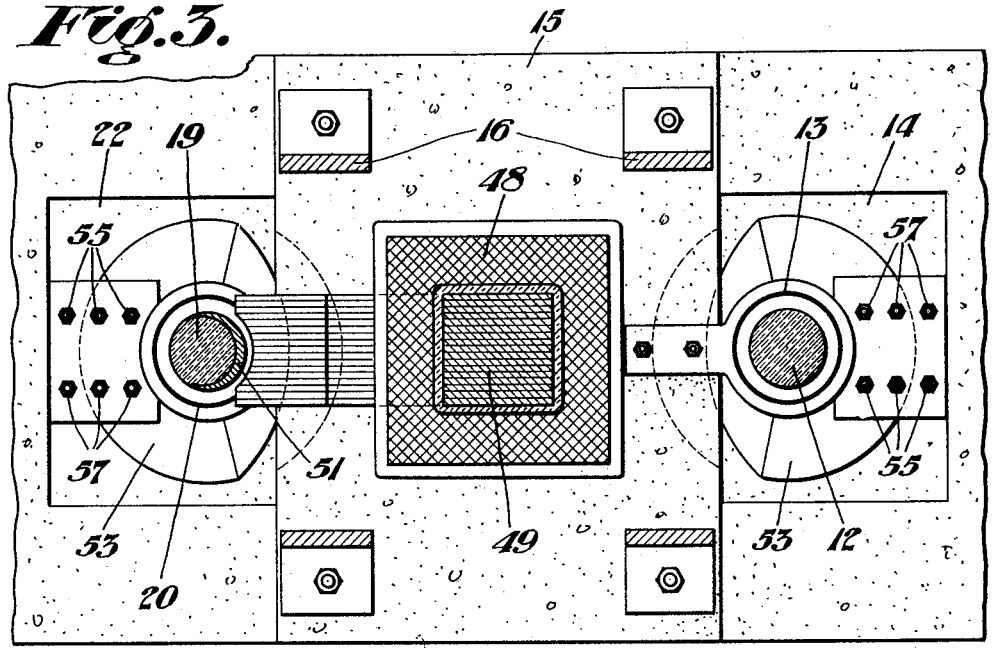
Figure 3 is a horizontal section taken substantially on the line III—III of Figure 2.
Figure 4:
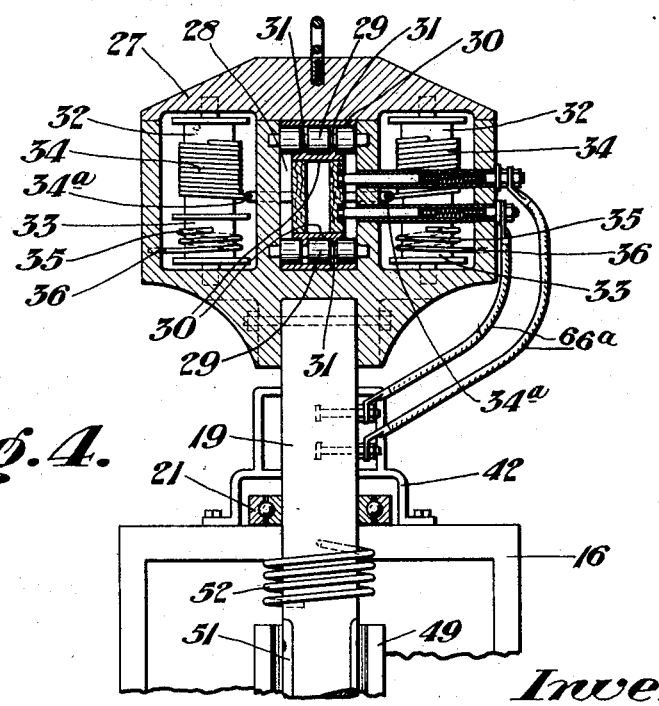
Figure 4 is an enlarged fragmentary section on the line IV—IV of Figure 1.

Should an object, such as an automobile, be struck by the end of the gate while the gate is being swung into position the gate will be caused to move inwardly, unwinding the cables 34 from the drums 32 during this inward movement. During this inward movement, the springs 35 will be tensioned and when the pressure upon the end of the gate is released the springs will act to move the gate outwardly to its normal position. Outward movement of the gate is limited by means of stops 37 which are located upon opposite sides of the gate. These stops are movable with respect to the gate and their movement is yieldingly resisted by springs 38. As the gate moves outwardly under the action of the springs 35, the stops 37 will engage the adjacent end of the head 27 and limit outward movement of the arm, the springs 35 being so tensioned as to move the gate slightly inward so that the stops 37 will be spaced a slight distance from the adjacent end of the head 27, as shown in Figures 1 and 2 of the drawings.

The gate V is normally held in inactive position so as to permit the free passage of vehicles over the crossing and for this purpose the invention provides a latch 39$^a$. This latch is adapted to enter a socket 39 provided in the head 27 and is normally forced into the socket through the action of a spring 40. A solenoid 41 acts to retract the latch and release the gate. The solenoid is contained within a housing 42 within which is positioned a contact post 43. When the gate is moved to an active position, this post is engaged by spring contact arms 44 which are carried by the post 19 and insulated therefrom in any usual manner and which are electrically connected to conductors 66$^a$ leading to the signals 25 and 26. The post 43 is provided with binding posts 45 for connection with conductors 66 in the electric circuit.

Mounted upon the frame 16 is a bracket 46 which carries a spring bumper or stop 47, the latter being arranged to limit swinging movement of the gate in one direction.

Mounted within the frame 16 is an electromagnet 48 having a core 49 and mounted upon the posts 12 and 19, respectively, are armatures 50 and 51. These armatures are spaced from the core but are arranged in the field of the magnet and are positioned normally, as shown in Figure 8 of the drawings, so that when the magnet is energized the armatures will be attracted to rotate the posts 12 and 19 and move the gates a quarter turn from an inactive to an active position. The gate V is locked in this position by means of the latch 39$^a$.

When the electromagnet is de-energized, the gates V and P will be automatically returned to their inactive positions by means of springs 52 which surround and are connected with the posts 12 and 19.

In order to regulate the speed of rotation of the gates, both posts 12 and 19 have connected thereto transversely wedge-shaped segments 53. These segments are engaged by relatively inclined plates 54 which have extending therefrom rods 55. These rods are surrounded by springs 56 and, by adjusting the nuts 57 upon these rods, the tension of the springs may be regulated, and the degree of friction between the plates 54 and the segments 53 may be regulated. Thus, the speed of travel of the gates may be controlled.

In order to operate the gates, the track is divided into a main block A and this block is divided into sub-blocks A$^1$, A$^2$, A$^3$ and A$^4$. When a train reaches the block A$^1$, current will travel from one side of the battery 58 through a conductor 59, a solenoid $a$, a conductor 60 to one rail of the block, through the train to the other rail and back to the battery through a conductor 61. The solenoid $a$ will thus be energized to operate a switch 62 and a switch 63, the switch 62 closing a circuit through a conductor 64, a battery 65, conductors 66, to post 43. The circuit from the post 43 will be completed through the arms 44 and conductors 66$^a$ to signals 25 and 26, and back to the switch 62 through a conductor 67 after the gate V is swung into active position, since the movement of the gate into active position will cause arms 44 to contact with the post 43.

At the same time, the switch 63 will close a circuit through a conductor 68, a solenoid 69, a conductor 70, the battery 58, the conductor 61 to one rail of the track and to the other rail through the train and back to the switch through a conductor 71, a portion of the train having passed into the block A$^2$.

As soon as the train enters the block A$^2$, a circuit will be completed through the battery 58, the solenoid $b$, the conductor 72, one of the rails, through the train to the other rail and back to the battery 58 through the conductor 61. The core of the solenoid $b$ will thus be extended so that its hooked end 73 will engage upon top of the hooked end 74 of the core of the solenoid $a$, and hold the switches 62 and 63 in closed position.

Operation of the solenoid 69 will close a switch 75 so that a circuit will be closed through a conductor 76 connected to this switch and to a battery 77. Current will flow from the battery through a conductor 78, the coil 48 of the electro magnet which operates the gates, a conductor 79, and a conductor 80, back to the switch 75. At the same time the solenoid 41 of the latch 38 will be energized through the conductor 80$^a$ and 81, so that the latch 38 will be disengaged from the socket 39 and the gate released to permit of its operation under the influence of the magnet coil 48.

As soon as the train passes out of the block A$^2$, all of the coils will be de-energized and the parts will return to their normal positions. The gate will return to an inactive position under the influence of the spring 52 and the latch 38 will be again engaged within the notch 39 to hold the gate in normal position.

As the train passes out of the block A$^3$, the solenoid $b'$ will be energized so that the hooked end 73$'$ of its core will be extended. For this purpose, current will flow from the battery 58$'$ through a conductor 82 to the core of the solenoid $b'$, a conductor 83 to one of the rails through the train to the other rail and back to the battery 58$'$ through a conductor 84, a portion of the train having passed into the block A$^4$.

As operation of the solenoid $b'$ occurs before a circuit is completed through the solenoid $a'$ or the solenoid $c'$, the core of the solenoid $b'$ will be in the path of movement of the core of the solenoid $a'$, so that this last mentioned solenoid cannot operate to close the switches 62$'$ and 63$'$, and the circuits controlled by these switches will thus remain open.

A train entering the track from an opposite direction will operate the solenoids $a'$, $b'$, and $c'$ after the manner of the solenoids $a$, $b$ and $c$, so that the gate and signals will be operated by a train travelling in either direction.

It is, of course, understood that where a double track is employed, the solenoids $a'$, $b'$ and $c'$ will be connected with the other track.

It will be apparent from the foregoing description and accompanying drawings that should a vehicle be trapped upon the crossing with the gates closed, the vehicle may pass the closed gate without injury either to the gate or the vehicle. This is due to the fact that there is no mechanical action between the gate moving means (the magnet) and the post, the gate being free to move under pressure and, after pressure is relieved, the gate will return to its active position under the influence of the magnet. If during the closing of the gate the end of the arm 24 should engage against a vehicle, or when a vehicle is trapped and runs through the gate so that the gate rubs or rides along the vehicle, the gate arm 24 will move longitudinally in the head 27, thus reducing the effect of the blow delivered to the vehicle. The invention is susceptible of various changes in its form, proportions and minor details of construction and the right is herein reserved to make such changes as properly fall within the scope of the appended claims.

I claim—

1. In an electrically operated railway crossing gate, a spring influenced rotatably mounted post, an arm extending horizontally therefrom, means to hold the arm in inactive position, an electromagnet, an armature carried by the post and arranged in the field of the magnet to rotate the post and move the arm to an active position when the magnet is energized, and train controlled means to release the arm holding means and close a circuit through the magnet.

2. In an electrically operated railway crossing gate, a spring influenced rotatably mounted post, a head mounted upon the post and having an opening therethrough, an arm mounted for longitudinal sliding movement within the opening, flexible means connecting the arm and head, and means to yieldingly resist sliding movement of the head in one direction.

3. In an electrically operated railway crossing gate, a spring influenced rotatably mounted post, a head mounted upon the post and having an opening therethrough, a drum mounted for rotation within said head, a cable wound upon the drum and having one end connected to the arm, said cable unwinding from the drum when the arm is moved longitudinally in one direction, and means to wind the cable upon the drum to move the arm longitudinally in an opposite direction.

4. In a normally inactive electrically operated railway crossing gate, a spring influenced, rotatably mounted post, an arm extending horizontally therefrom, means to normally hold said post against rotation in inactive position, a signal, an electro magnet, an armature carried by the post and arranged in the field of the magnet to rotate the post and move said arm to an active position when the magnet is energized, a train controlled solenoid common to the signal and said armature to close a circuit through said signal and said armature so as to operate said signal and gate, a second train controlled solenoid operable to hold said first named solenoid in active position, and means to move said second named solenoid to an inactive position when the energizing circuit thereto is broken.

5. In a normally inactive electrically operated railway crossing gate, a spring influenced, rotatably mounted post, an arm extending horizontally therefrom, means to normally hold said post against rotation in inactive position, an electromagnet, an armature carried by the post and arranged in the field of the magnet to rotate the post and move said arm to an active position when the magnet is energized, electrically operated means for completing the electric circuit to said magnet, and means including the railway track and a vehicle on said track for completing an energizing circuit to said last named means.

In testimony whereof, I have hereunto set my hand.

WILLIAM R. DUNNAM.